US012630741B2

(12) United States Patent
Kim et al.

(10) Patent No.: US 12,630,741 B2
(45) Date of Patent: May 19, 2026

(54) BLACK COATING COMPOSITION HAVING HIGH HEAT RESISTANCE, MANUFACTURING METHOD THEREOF AND HOME APPLIANCES USING THE SAME

(71) Applicant: LG Electronics Inc., Seoul (KR)

(72) Inventors: Soyoon Kim, Seoul (KR); Juwon Kim, Seoul (KR); Hyunwoo Jun, Seoul (KR); Jaekyung Yang, Seoul (KR); Dong Jin Kim, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 454 days.

(21) Appl. No.: 18/074,029

(22) Filed: Dec. 2, 2022

(65) Prior Publication Data

US 2023/0174820 A1 Jun. 8, 2023

(30) Foreign Application Priority Data

Dec. 3, 2021 (KR) ........................ 10-2021-0171915

(51) Int. Cl.
*C09D 183/16* (2006.01)
*C09D 7/61* (2018.01)

(52) U.S. Cl.
CPC ............. *C09D 183/16* (2013.01); *C09D 7/61* (2018.01)

(58) Field of Classification Search
CPC ................................ C09D 7/61; C09D 183/16
See application file for complete search history.

(56) References Cited

U.S. PATENT DOCUMENTS 5,462,769 A * 10/1995 Tsai ........................ B05D 5/086 427/307
6,921,431 B2 7/2005 Evans et al.
2005/0051057 A1 3/2005 Evans et al.
2007/0190308 A1* 8/2007 Brand .................. C09D 183/16 427/407.1

FOREIGN PATENT DOCUMENTS

CH 709779 A2 * 12/2015 ............ A47J 36/025
CN 109401602 A 3/2019
CN 109401617 A 3/2019
KR 20200075171 6/2020
WO WO2005026402 3/2005
WO WO-2020073889 A1 * 4/2020 ........... C09D 183/10

OTHER PUBLICATIONS

Machine translation CH709779A2 (Year: 2025).*
Machine translation WO-2020073889-A1 (Year: 2020).*
Iota Silicone Oil (available online at https://www.siliconeoil.net/product-perhydropolysilazane-iota-phps.html as of Apr. 18, 2025) (Year: 2025).*
Extended Search Report in European Appln. No. 22210793.0, mailed on May 8, 2023, 7 pages.

* cited by examiner

*Primary Examiner* — Alexandre F Ferre
(74) *Attorney, Agent, or Firm* — Fish & Richardson P.C.

(57) ABSTRACT

A coating composition has heat resistance, transparency, and high hardness. The coating composition is configured to be applied to a stainless steel material. The coating composition includes a polysilazane, a solvent, a dark pigment and a dispersant. A home appliance includes a base including a stainless steel material and a coating layer disposed on the base. The coating layer includes the coating composition.

10 Claims, 4 Drawing Sheets

BLACK COATING COMPOSITION HAVING HIGH HEAT RESISTANCE, MANUFACTURING METHOD THEREOF AND HOME APPLIANCES USING THE SAME

CROSS-REFERENCE TO RELATED APPLICATION

This application claims priority to and the benefit of Korean Patent Application No. 10-2021-0171915, filed on Dec. 3, 2021, the disclosure of which is incorporated herein by reference in its entirety.

BACKGROUND

1. Field of the Invention

The present invention relates to a black coating composition with high heat resistance and a home appliance using the same.

2. Discussion of Related Art

For home appliances such as a refrigerator, an exterior material for a microwave oven, a cooking top, and an oven cavity, stainless steel materials are used. In order to color such a stainless steel material, the surface of the material is coated with a black coating composition based on an organic material.

However, the conventional coating layer using an organic material-based black coating composition has a problem in that the organic material is carbonized when exposed to a high temperature of 150° C. or more.

In addition, due to a low surface hardness, the organic material-based black coating composition has severe external scratches.

In addition, when the organic material-based black coating composition is used for a cooktop or an oven, there is a problem that yellowing occurs at a high temperature and cracks are generated on the surface.

SUMMARY OF THE INVENTION

The present invention is directed to providing a novel coating composition with heat resistance, transparency, and high hardness.

The present invention is also directed to providing a coating composition, which does not have a change in chemical structure at a high temperature of 200° C. or more, and preferably 300° C. or more and has no yellowing.

The present invention is also directed to providing a method of preparing a novel coating composition with heat resistance, transparency, and high hardness.

The present invention is also directed to providing a home appliance, which includes a coating layer formed from the novel coating composition with heat resistance, transparency, and high hardness.

The objects of the present invention are not limited to the above-mentioned objects, and other objects and advantages of the present invention which are not mentioned can be understood by the following description and more clearly understood by exemplary embodiments of the present invention. In addition, it will be readily apparent that the objects and advantages of the present invention may be realized by means determined by the claims and a combination thereof.

The present invention provides a coating composition, which includes a polysilazane, a solvent, a dark pigment, and a dispersant to express heat resistance, transparency, and high hardness.

Here, the coating composition of the present invention may include 1 to 20 wt % of the polysilazane, 50 to 97 wt % of the solvent, 0.1 to 20 wt % of the dark pigment, and 0.1 to 40 wt % of the dispersant.

The polysilazane preferably has a structure represented by Formula 1 below.

[Formula 1]

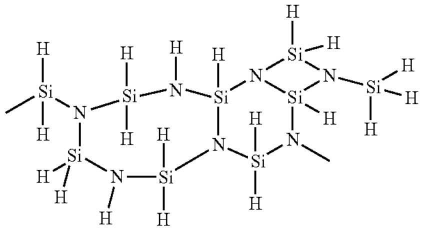

In addition, the dark pigment may include one or more of carbon black, graphite, and black $TiO_2$, and preferably has a particle diameter of 200 to 350 nm.

In addition, the method of preparing a coating composition according to the present invention includes (a) preparing a mixture in which a solvent, a dark pigment, and a dispersant, and milling the mixture; and (b) inputting a polysilazane to the mixture and stirring.

In addition, the home appliance according to the present invention includes a base containing a stainless steel material; and a coating layer formed on the base, wherein the coating layer includes a polysilazane, a solvent, a dark pigment, and a dispersant.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
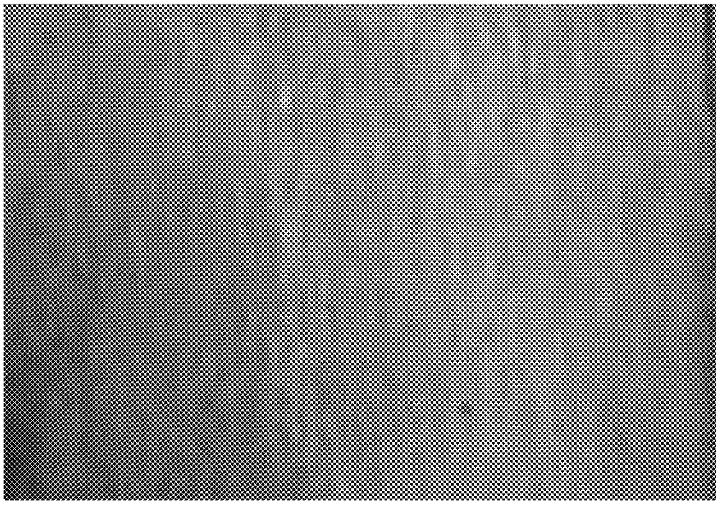
FIG. 1 is a photograph showing a surface of a coating layer according to an embodiment of the present invention.

The above-described objects, features and advantages will be described below in detail with reference to the accompanying drawings, and therefore, those of ordinary skill in the art to which the present invention belongs may easily implement the technical idea of the present invention. To explain the present invention, when detailed description on the related art is determined to unnecessarily obscure the subject matter of the present invention, the detailed description will be omitted. Hereinafter, exemplary embodiments according to the present invention will be described in detail with reference to the accompanying drawings. In each drawing, like numerals denote like elements.

Singular expressions used herein include plural expressions unless the context clearly indicates otherwise. The terms "comprise," "consist of," and "include" used herein should not be construed as necessarily including all of various components or steps described herein, and should be construed that some components or steps may not be included, or additional components or steps may be further included.

Hereinafter, a coating composition, a method of preparing the coating composition and a home appliance using the same according to an embodiment of the present invention will be described.

Coating Composition

A coating composition according to an embodiment of the present invention is not changed in chemical structure, does not have yellowing, and has high hardness at a high temperature, unlike a conventional coating composition used for home appliances.

Particularly, the coating composition of the present invention may be used as a paint for a colored stainless steel sheet.

The coating composition of the present invention solves a problem of lowering adhesion with the above-described material such as stainless steel, and ensures high hardness, transparency, and processability and does not have yellowing even at a high temperature.

The coating composition according to the present invention includes a polysilazane, a solvent, a dark pigment, and a dispersant.

The coating composition may include 1 to 20 wt % of the polysilazane, 50 to 97 wt % of the solvent, 0.1 to 20 wt % of the dark pigment, and 0.1 to 40 wt % of the dispersant.

The coating composition of the present invention includes a polysilazane to ensure heat resistance, transparency, and high hardness.

Since the polysilazane has a hydrophilic property after curing, it may improve the cleaning performance of the coating layer. In addition, the polysilazane has excellent heat resistance so it is not deformed under a high temperature condition of 300° C. or more. In addition, the polysilazane has excellent pigment dispersibility compared to a silicate-based coating solution.

The polysilazane may be included in the coating composition as a solid form.

In addition, the polysilazane may have a structure of Formula 1 below.

[Formula 1]

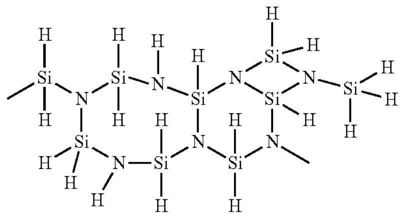

The coating composition may include 1 to 20 wt % of the polysilazane.

When the polysilazane is included in the coating composition at less than 1 wt %, the heat resistance and hardness of the coating layer may be degraded, and when the polysilazane is included in the coating composition at more than 20 wt %, coating performance may even be degraded.

Next, the coating composition of the present invention includes a solvent to satisfy the compatibility with the polysilazane, dispersibility, and coatability.

The solvent may be an organic solvent, for example, dibutyl ether or propyleneglycol monomethyletheracetate.

In addition, the coating composition may include 50 to 97 wt % of the solvent to satisfy the compatibility with the polysilazane, dispersibility, and coatability.

Next, the coating composition of the present invention includes a dark pigment to impart transparency while imparting a dark color to the coating layer. The dark pigment of the present invention does not cause discoloration at a high temperature, and must have a suitable particle diameter and excellent dispersibility.

The dark pigment may include one or more of carbon black, graphite, and black $TiO_2$, but the present invention is not limited thereto.

The coating composition of the present invention may include 0.1 to 20 wt % of the dark pigment. When the dark pigment is included in the coating composition at less than 0.1 wt %, the required color of the coating layer may not be expressed, and heat resistance or hardness may be lowered. When the dark pigment is included in the coating composition at more than 20 wt %, the transparency of the coating layer may be lowered, and the coating performance may also be lowered.

The dark pigment may have a particle diameter of 200 to 350 nm.

When the dark pigment particle is large, the exterior texture may degrade, and therefore, a translucent coating layer may be formed by uniformly dispersing a dark pigment having a particle size of 350 nm or less on the coating layer.

In addition, when the dark pigment particle size is very small, dispersion may be difficult due to strong cohesion between particles, and therefore, the use of a dark pigment having a particle diameter of 200 nm or more is most suitable for realizing translucency of the coating layer and ensuring the dispersibility of the dark pigment.

Next, the coating composition of the present invention includes a dispersant for proper dispersion of the dark pigment.

The dispersant may be suitably selected depending on the type of the dark pigment.

The dispersant may include one or more of a phosphoric acid ester, a carboxylic acid ester, a polyurethane-based dispersant, a hyperbranched polyamine and a polyacrylate.

In addition, the coating composition may include the dispersant in the range of 0.1 to 40 wt/o to improve the dispersibility of the dark pigment.

As described above in detail, the coating composition according to the embodiment of the present invention has no chemical change, does not have yellowing, and has high hardness at a high temperature, unlike a conventional coating composition used for home appliances. In addition, the coating composition of the present invention may be used as a paint for a colored stainless steel sheet.

Method of Preparing Coating Composition

Hereinafter, a method of preparing a coating composition according to an embodiment of the present invention will be described.

The coating composition according to the embodiment of the present invention includes (a) milling (pulverizing) a mixture of components for the coating composition, and (b) inputting a polysilazane to the mixture and stirring the resulting mixture.

(a) Milling

First, (a) is a step of preparing a mixture which includes a solvent, a dark pigment, and a dispersant, and milling the mixture.

Here, for the milling (pulverizing) step, any one of a ball mill, a jet mill, and a planetary mill, which are conventionally known widely, may be used.

Moreover, in (a), milling may be performed such that the dark pigment has a particle size of 200 to 350 nm, and (a) preferably includes dry-pulverizing the dark pigment before the preparation of the mixture.

(b) Stirring

Next, (b) includes adding a polysilazane to the mixture and stirring.

The dark pigment is pre-dispersed in a solvent, and then the polysilazane is added to the mixture. This is because the polysilazane does not affect the dispersion of the dark pigment. When adding the polysilazane to the mixture, the polysilazane may be slowly added while stirring the mixture.

Through the above two steps, the coating composition of the present invention is prepared.

Home Appliance

Next, the home appliance of the present invention will be described. The home appliance may be a refrigerator, a microwave, a cooking top, or an oven, and any home appliance using a stainless steel material may be used without limitation.

The home appliance of the present invention includes a base containing a stainless steel material, and a coating layer formed on the surface of the base, and the coating layer is formed from the above-described coating composition.

The home appliance may further include a ceramic protection coating layer formed above the coating layer. The ceramic protection coating layer may use a transparent ceramic coating solution with hydrophilicity, and may use a silicate-based coating solution.

In addition, the coating solution may have a pencil hardness of 9H or more.

As the coating method for the coating layer, a known coating method may be applied. For example, flow coating or spray coating may be applied.

EXAMPLES

Hereinafter, the configuration and operation of the present invention will be described in further detail through the exemplary examples of the present invention. However, this is presented as exemplary examples of the present invention and cannot be construed as limiting the present invention in any sense.

Contents that are not described herein will be omitted because it can be technically inferred sufficiently by those of ordinary skill in the art.

1. Preparation of Coating Composition

Table 1 shows a preparation example of a coating composition according to Example, and the composition of an antimicrobial glass composition of Comparative Example and a composition ratio thereof.

TABLE 1

| | Preparation Example 1 (wt %) |
|---|---|
| Polysilazane | 1 |
| Solvent | 75 |
| Dark pigment (carbon black) | 13 |
| Dispersant (polyurethane-based) | 5 |

In Preparation Example 1, a solvent, a dark pigment and a dispersant were pulverized using a ball mill. A polysilazane was added to the pulverized mixture, and the mixture into which the polysilazane was added was stirred using a stirrer, thereby preparing a coating composition.

2. Examples and Comparative Example

(1) Example 1

Example 1 was to form a coating layer by applying the coating composition according to Preparation Example 1 on one surface of a stainless steel sheet using a spray coating method.

(2) Example 2

Example 2 was to form a protection coating layer by forming a coating layer by applying the coating composition according to Preparation Example 1 on one surface of a stainless steel sheet using a spray coating method, and forming a protection coating layer by coating the top surface of the coating layer with a lithium silicate-based coating solution.

(3) Comparative Example

Comparative Example 1 was to spray-coat one surface of a stainless steel sheet with an acryl-based organic coating solution.

2. Evaluation of Physical Properties in Examples and Comparative Example

(1) Evaluation of Heat Resistance

The color difference (ΔE) before and after heating according to a heating temperature was evaluated to evaluate the heat resistance between Examples and Comparative Example.

Figure 2:
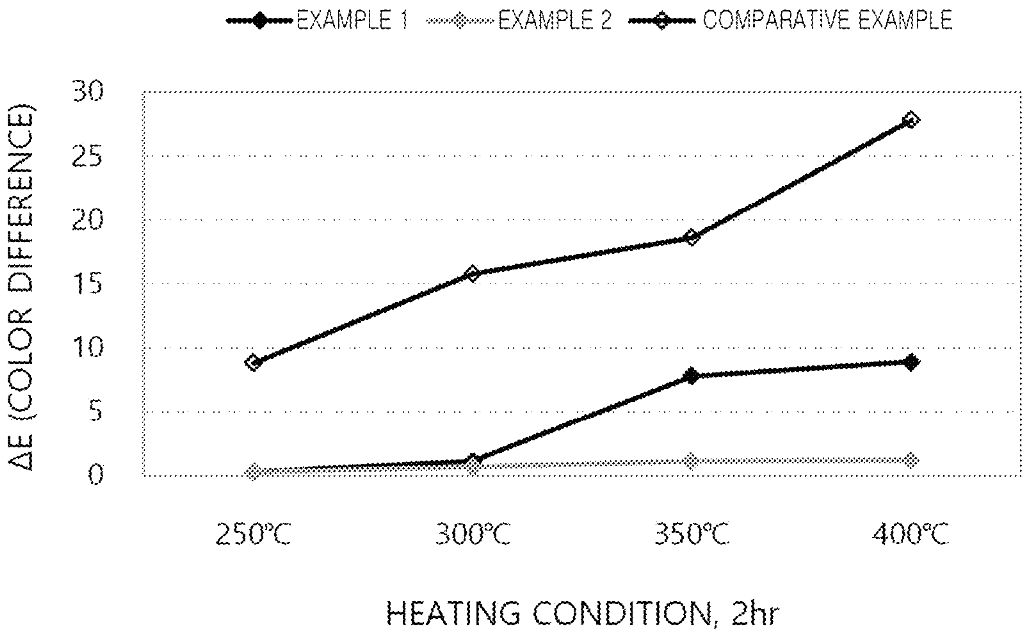
FIG. 2 is a graph showing a yellowing result of the coating layer.

Referring to FIG. 2, Examples 1 and 2 may be confirmed that there is no yellowing at least up to 300° C. However, in Comparative Example, it can be confirmed that yellowing has already occurred at 250° C.

(2) Evaluation of Cleaning Performance

1) Evaluation 1

Olive oil/chicken oil was applied to the surface of Example 1 and set at 230° C. for 1 hour.

Afterwards, cleaning performance was evaluated based on whether the oil was thoroughly wiped within 5 times using a cotton wool.

Figure 3:
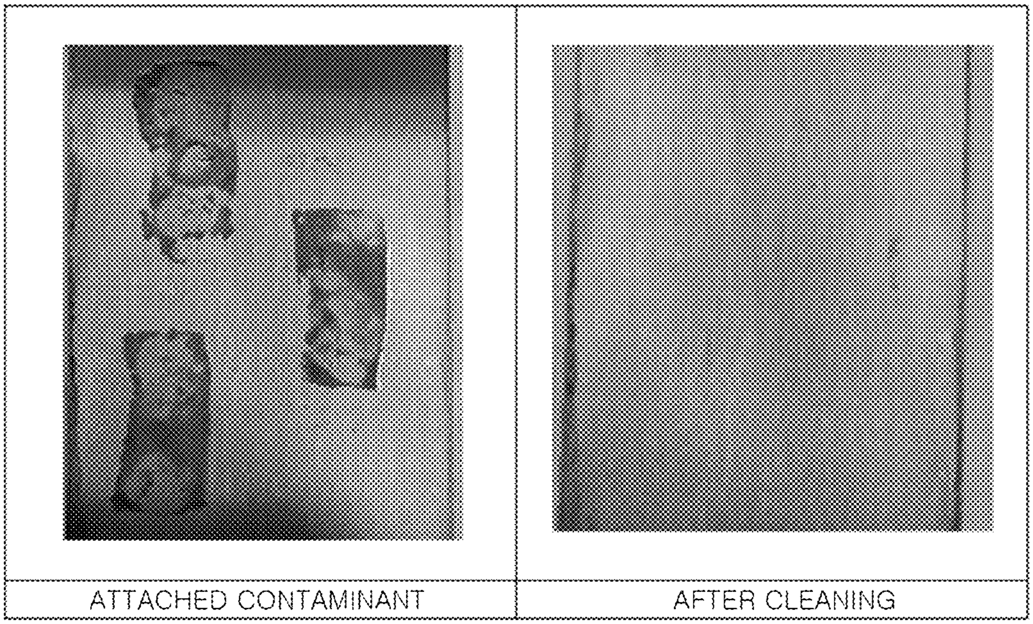
FIGS. 3 and 4 are sets of images showing a cleaning performance of the coating layer according to the embodiment of the present invention.

Referring to FIG. 3, it can be seen that all contaminants on the surface of Example 1 were removed.

2) Evaluation 2

Olive oil/chicken oil was applied to the surface of Example 1 and set at 300° C. for 1 hour.

Afterwards, cleaning performance was evaluated based on whether the oil was thoroughly wiped within 5 times using a cotton wool.

Figure 4:
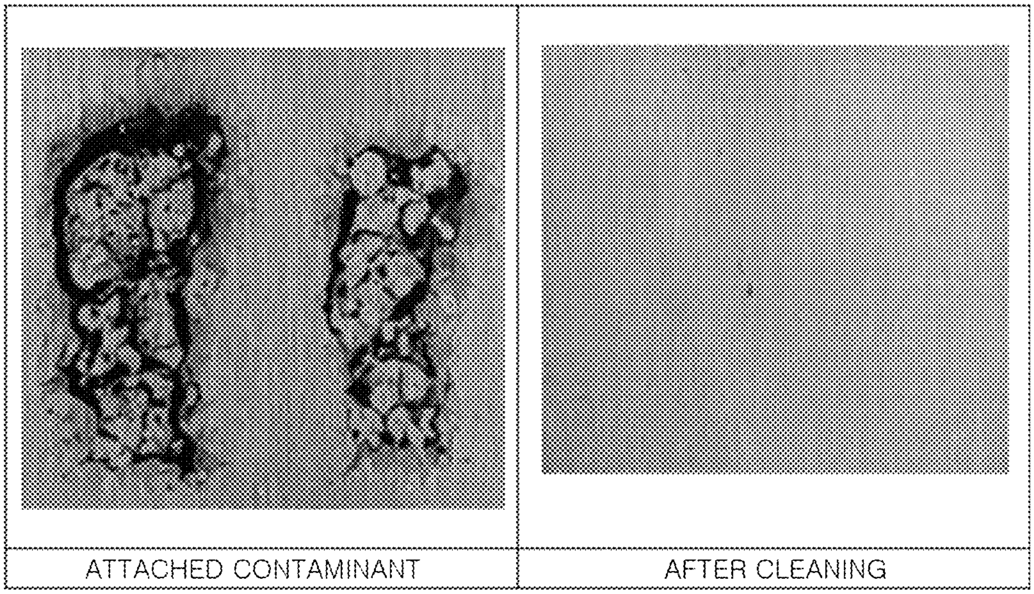

Referring to FIG. 4, it can be seen that all contaminants on the surface of Example 1 were removed.

(3) Evaluation of Hardness

Figure 5:
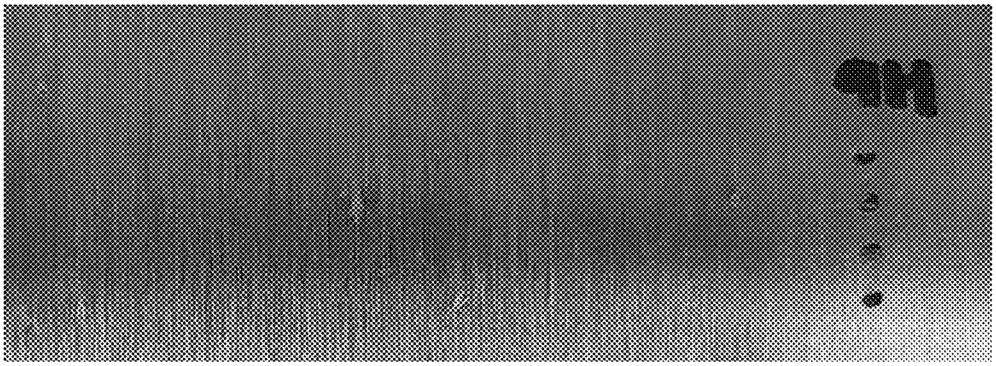
FIG. 5 is a photograph showing a pencil hardness of the coating layer according to the embodiment of the present invention.

A pencil hardness for the coating layer of Example 1 was evaluated. Referring to FIG. 5, it can be confirmed that the pencil hardness of the coating layer according to Example 1 of the present invention was evaluated to a level of 9H or more, and the coating layer according to Example 1 of the present invention was very strong against scratches.

(4) Evaluation of Cohesion and Impact Resistance

The cohesion and impact resistance of the coating layer of Example 1 were evaluated.

Figure 6:
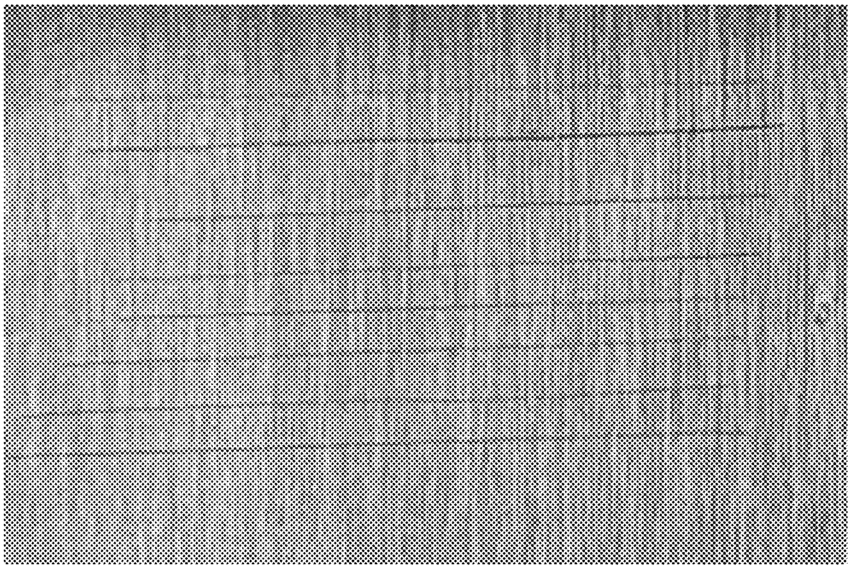
FIG. 6 is a photograph showing the result of a cross-cut test for the coating layer according to the embodiment of the present invention.

Referring to FIG. 6, it can be confirmed that, as a result of a cross-cut test, the coating layer according to Example 1 of the present invention was not peeled or cracked.

Figure 7:
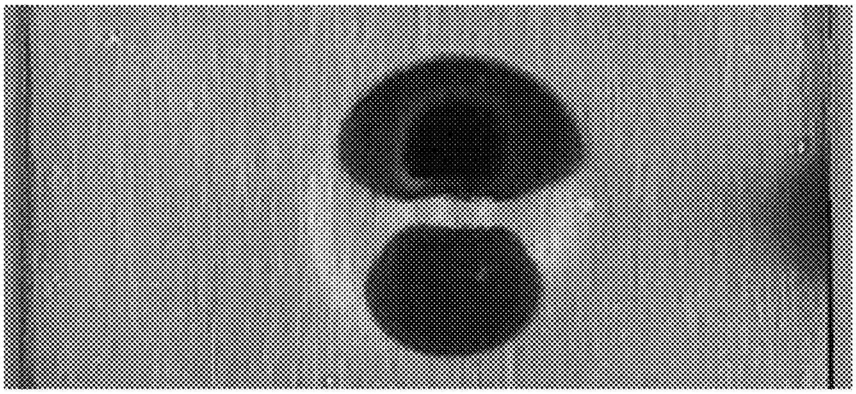
FIG. 7 is a photograph showing the result of an impact test for the coating layer according to the present invention.

In addition, referring to FIG. 7, as a result of an impact resistance test in which a steel ball with a diameter of 1" under a load of 2 kg free-fallen from 30 cm above the ground, it can be confirmed that the coating layer according to Example 1 of the present invention was not peeled or cracked.

According to the present invention, a coating layer, which has no change in chemical structure at a high temperature of at least 200° C. or more, no yellowing, and has high hardness, can be provided using a polysilazane, which is a ceramic-based coating material with heat resistance, transparency, and high hardness.

In addition, according to the present invention, a coating layer which imparts a color on a base surface of the stainless steel material and has heat resistance, transparency, and high hardness can be provided.

In addition to the above-described effects, the specific effects of the present invention will be described with reference to specific details for carrying out the present invention below.

As above, the present invention has been described with reference to the exemplified drawings, but it is clear that the present invention is not limited by the examples and drawings disclosed herein, and can be modified in various ways by those of ordinary skill in the art within the scope of the technical idea of the present invention. In addition, even though the action effect according to the configuration of the present invention has not been clearly described while describing the examples of the present invention above, it is obvious that effects that can be predicted by the corresponding configuration are also be recognized.

What is claimed is:

1. A coating composition comprising:

1 to 20 wt % of a polysilazane;

50 to 97 wt % of a solvent;

0.1 to 20 wt % of a dark pigment; and 5 to 40 wt % of a dispersant, the dispersant comprising one or more of a phosphoric acid ester, a carboxylic acid ester, a polyurethane-based dispersant, a hyperbranched polyamine, and a polyacrylate, wherein the polysilazane has a structure of Formula below:

Formula

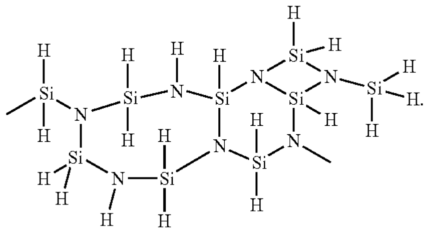

2. The composition of claim 1, wherein the solvent is dibutyl ether or propyleneglycol monomethyletheracetate.

3. The composition of claim 1, wherein the dark pigment comprises one or more of carbon black, graphite, and black $TiO_2$.

4. The composition of claim 1, wherein the dark pigment has a particle diameter of 200 to 350 nm.

5. A home appliance, comprising:

a base including a stainless steel material; and a coating layer disposed on the base, wherein the coating layer includes the coating composition of claim 1.

6. The home appliance of claim 5, further comprising:

a ceramic protection coating layer disposed on the coating layer.

7. The home appliance of claim 5, wherein the coating layer has a pencil hardness of 9H or more.

8. A method for preparing the coating composition according to claim 1, comprising:

(a) preparing a mixture that includes a solvent, a dark pigment, and a dispersant, and milling the mixture; and (b) inputting a polysilazane to the mixture and stirring the resulting mixture.

9. The method of claim 8, wherein (a) comprises milling the dark pigment to have a particle diameter of 200 to 350 nm.

10. The method of claim 8, wherein (a) comprises, before the preparation of the mixture, dry-pulverizing the dark pigment.

* * * * *